3,167,318
MATERIAL UNLOADER AND SPREADER WITH
BODILY SHIFTABLE SPREADER SHAFT
Howard J. Ferris, Gulfport, Fla., assignor to Starline, Inc., a corporation of Illinois
Filed Oct. 15, 1962, Ser. No. 230,396
16 Claims. (Cl. 275—3)

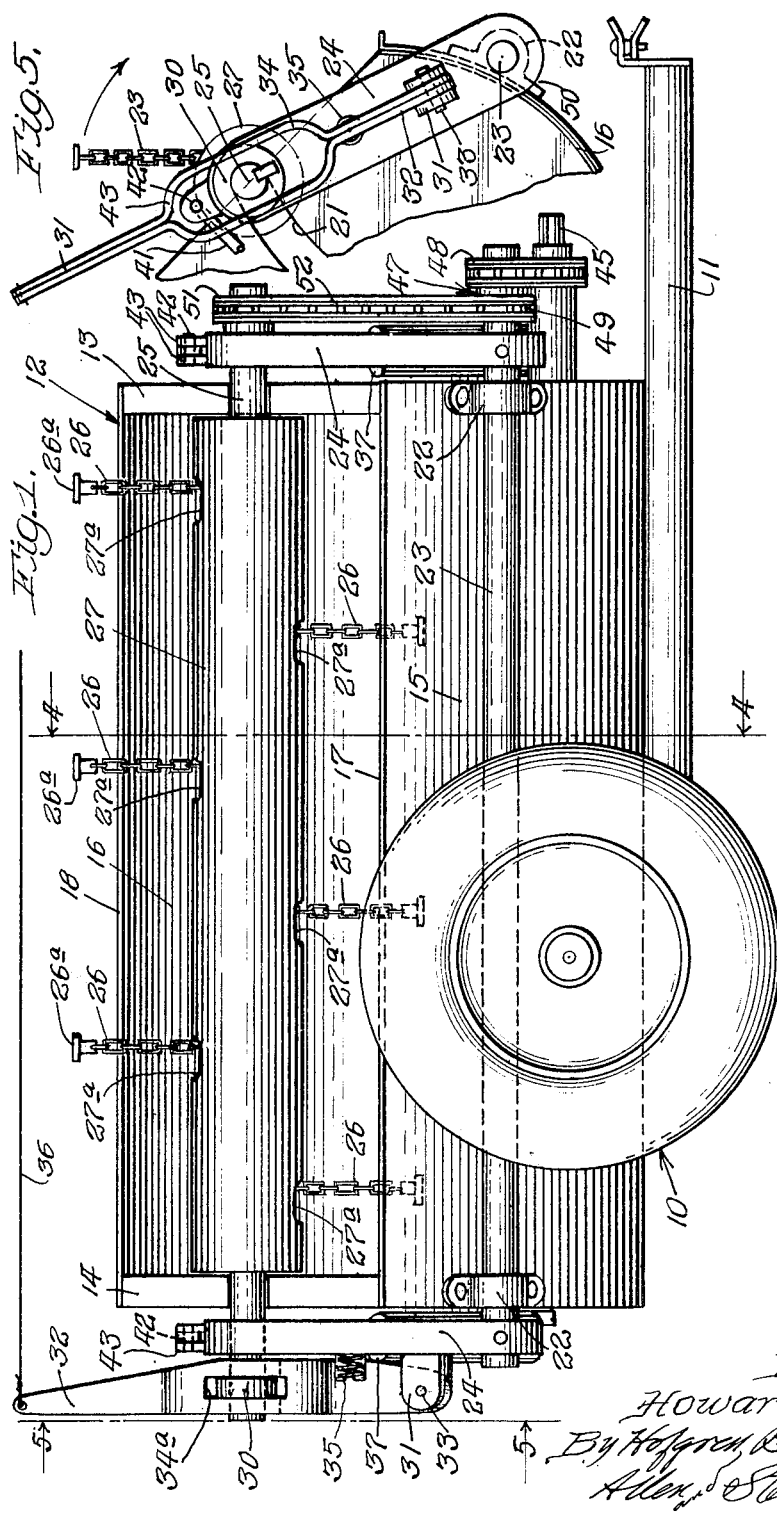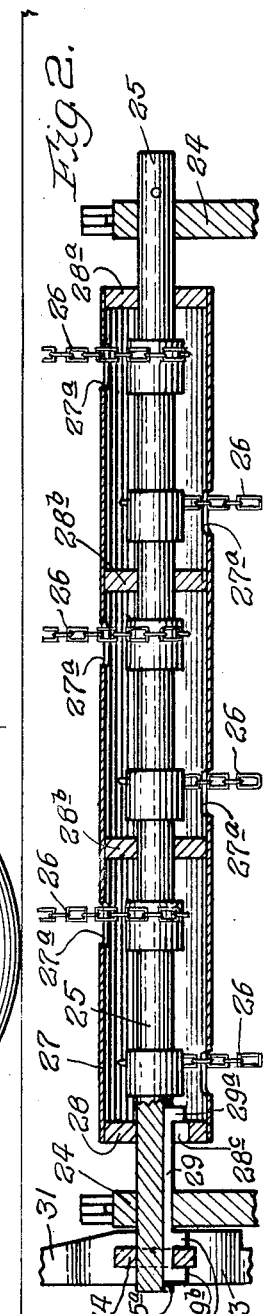

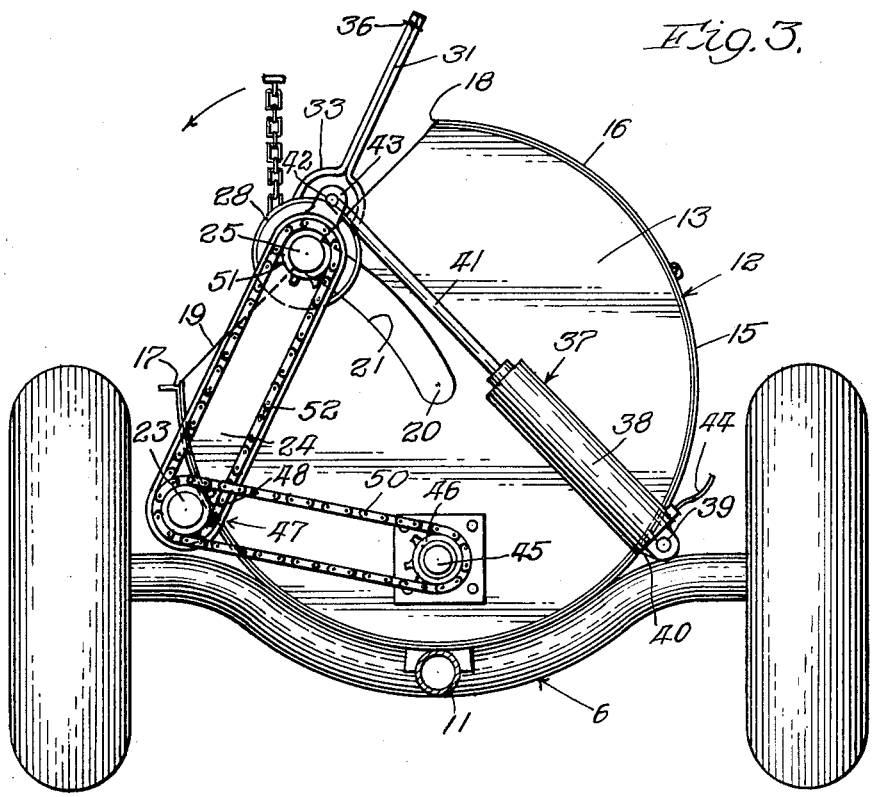
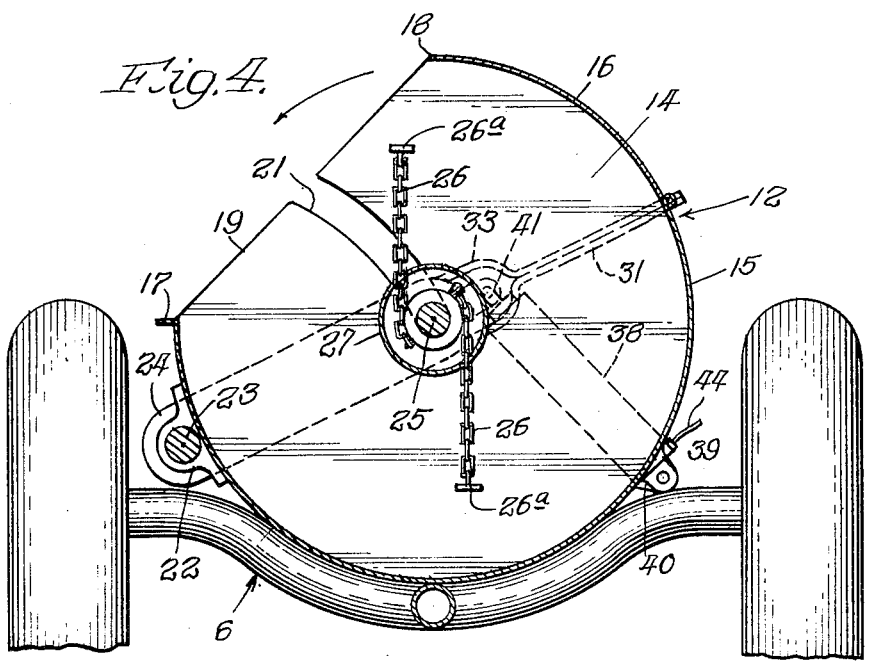

This invention relates to a material unloading and spreading device of the type having a cylindrical container with a longitudinal unloader shaft and flexible flails on the shaft, and in particular it relates to such a device in which the unloader shaft is bodily shiftable from a position adjacent the container discharge opening to a position on the axis of the container.

The present invention is directed to material spreaders of the type disclosed and claimed in Elwick Patents 2,886,332 and 3,048,409, and the principal object of the invention is to provide a mechanism which reduces the relatively high initial power requirements of such a material spreader.

Material spreaders of the type disclosed in the above Elwick patents are rapidly gaining acceptance because of their extreme versatility in handling various kinds of material, but one of the problems inherent in their operation results from the fact that a farmer using such a spreader will ordinarily load it as heavily as possible, and this means that the unloader shaft is customarily buried under a couple of feet of material at the start of an unloading operation. Accordingly, starting torque is extremely high, and probably the heaviest load on a tractor power take-off is during the initial operation of the unit when the unloader shaft is buried.

The present invention eliminates the extremely high starting torque and initial power requirements by mounting the unloader shaft on a pair of arms which may rock the shaft from a position in the plane of the material discharge opening of the container to a position on the axis of the container as unloading progresses. Thus, the flail chains and unloader shaft are outside the material at the beginning of an unloading operation, and work their way through the load of material as the container is emptied.

Coupled with the arrangement for bodily swinging the unloader shaft into the container is a mechanism for controlling the unwinding of the flexible flail members from the unloader shaft, so that as the shaft is moved bodily into the container the flails may be gradually unwound from the shaft so as to swing in an increasingly larger arc as unloading progresses.

The invention is illustrated in a preferred embodiment in the accompanying drawings in which:

FIG. 1 is a side elevational view of a spreader constructed in accordance with the invention;

FIG. 2 is a fragmentary longitudinal sectional view of the unloader shaft and the means for controlling unwinding of the flails from the shaft;

FIG. 3 is a front elevational view of the apparatus with the unloader shaft in its starting position;

FIG. 4 is a fragmentary section taken substantially as illustrated along the line 4—4 of FIG. 1 with the unloader shaft in its axial position; and FIG. 5 is a fragmentary rear elevational view taken substantially as illustrated along the line 5—5 of FIG. 1.

Referring to the drawings in greater detail, and referring first to FIG. 1, a wheeled carriage, indicated generally at 10, is provided with a tongue 11 by means of which the carriage may be connected to the drawbar of a tractor, and surmounting the wheeled carriage is a material container, indicated generally at 12.

The container 12 has front and rear end walls 13 and 14, and a generally cylindrical body 15 which preferably includes a hinged hood 16 which may be opened to facilitate loading of the container. A longitudinal margin 17 of the cylindrical body and a longitudinal edge 18 of the hood define the sides of a material discharge opening 19 which occupies an upper quadrant between horizontal and vertical planes through the axes 20 of the end walls (FIG. 3). Arcuate slots 21 in the end walls extend from the axes 20 substantially to the longitudinal median line of the discharge opening 19.

A pair of bearing brackets 22 mounted on the end walls 13 and 14 support a rock shaft 23 on the center of curvature of the slots 21, and at the ends of the rock shaft, outside the ends walls 13 and 14, are rocker arms 24.

As best seen in FIG. 2, an unloader shaft 25 is positioned in the container 12 with its ends extending through the slots 21 in the end walls, and said ends are journaled in the rocker arms 24 so that rocking movement of the arms permits the unloader shaft 25 to traverse the slots 21 from the position of FIG. 3 to the position of FIG. 4. Pivotally mounted on the shaft 25 are flexible flails 26 which preferably take the form of heavy chains that may be wrapped around the shaft 25.

Surrounding the unloader shaft is a sleeve 27 having holes 27a through which the flails 26 extend; and the sleeve has end walls 28 and 28a and intermediate strengthening walls 28b journaled on the shaft, so that the shaft and the sleeve are relatively rotatable. Adjacent the rear end of shaft 25 is a longitudinal keyway 25a in which a key 29 is slidably mounted to provide means to selectively clutch the sleeve and shaft for simultaneous rotation or free them for independent rotation. Accordingly, the key has a clutch lug 29a at its inner end which is selectively engageable with a slot 28c in the end wall 28 of the sleeve upon endwise movement of the key, and at the outer end of the key are spaced lugs 29b between which a collar 30 is loosely supported on the shaft.

Secured to the rear rocker arm 24 below the shaft 25 is a bifurcated bracket 31 in which a lever arm 32 is pivoted at 33. As best seen in FIGS. 2 and 5, lever 31 has a bifurcated central portion 34 which straddles the shaft, and aligned slots 34a in the portion 34 receive the opposite margins of the collar 30 on the shaft 25. Thus, pivotal movement of the lever 32 may slide key 29 endwise to engage or disengage the lug 29a and slot 28c. As seen in FIG. 1, a compression spring 35 is positioned between the rocker arm 24 and the lever 32 to normally urge said lever outwardly to a position in which the lug 29a is engaged with the slot 28c. A pull cord 36 secured to the upper end of lever 32 may be pulled by an operator on a tractor to declutch the sleeve 27 from the shaft 25, and released to clutch them.

At the start of an unloading operation, the flail chains 26 are wound around the shaft 25 inside the sleeve 27, and only the flail plates 26a are outside the holes 27a in the sleeve. As long as the shaft 25 and sleeve 27 are clutched together for simultaneous rotation, the chains 26 necessarily remain wound around the shaft 25 because the sleeve 27 prevents centrifugal force from causing them to unwind. As unloading progresses, it is necessary that the flail chains extend gradually to their full length with the flail plates 26a brushing the cylindrical wall 15, and to accomplish controlled extension of the chains, the operator may pull the cord 36 periodically to declutch the sleeve 27 from the shaft 25 and permit centrifugal force to pull the flail chains off the shaft until the cord 36 is again released.

Movement of the rocker arms 24 is produced by a pair of extensible hydraulic cylinder and piston units, indicated generally at 37, each of which includes a cylinder 38 pivoted at 39 to a bracket 40 on one of the end walls of the container, and a piston having a piston rod 41 pivotally connected at 42 to a bifurcated bracket 43 surmounting one of the arms 24. Hydraulic fluid for collapsing and extending the cylinder and piston unit 37 is provided from the hydraulic reservoir of a tractor through a hydraulic line 44, and a suitable control valve (not shown) on the tractor permits an operator to rock the arms 24 inwardly toward the axis of the container as unloading progresses.

The drive for unloader shaft 25 is best seen in FIGS. 1 and 3, and includes an input shaft 45 which is adapted to be operatively connected to the power take-off of a tractor, and a power sprocket 46 on the input shaft 45. Journaled on rock shaft 23 is a double sprocket assembly 47 which includes an input sprocket 48 and an output sprocket 49, the input sprocket being driven from the power sprocket 46 by means of a roller chain 50. Keyed to the projecting forward end of unloader shaft 25 is a drive sprocket 51, and a drive chain 52 is trained around the drive sprocket 51 and around the output sprocket 49 of the sprocket assembly 47. Thus, the drive for the unloader shaft 25 extends along the rocker arm 24 so that the rocking movement of the arms and the unloader shaft has no effect upon the drive of the shaft.

Although the invention has been described with respect to a preferred embodiment, it is not to be so limited, as changes and modifications can be made which are within the full intended scope as defined by the appended claims.

I claim:

1. A material spreader comprising, in combination: a wheeled material container having two generally circular end walls and an arcuate side wall the longitudinal margins of which define the sides of a material discharge opening that occupies an upper quadrant between horizontal and vertical planes through the axes of the end walls, said end walls being provided with aligned arcuate slots which extend from said axes substantially to the longitudinal median line of the discharge opening; a pair of arms pivotally mounted outside the two end walls on the center of curvature of said slots; an unloader shaft in the container with its ends extending through said arcuate slots, said shaft being journaled in said arms; a plurality of flexible flails spaced along the shaft, said flails being adapted to be wrapped around the shaft and to unwind therefrom by centrifugal force when the shaft is rotated; means for driving said shaft from a tractor power take-off; means for controlling the unwinding of the flails from the rotating shaft including a sleeve rotatably surrounding the shaft, said sleeve having holes through which the flails extend and the flails winding on the shaft inside the sleeve; means for selectively clutching the sleeve to the shaft for rotation therewith or releasing the sleeve for rotation about the shaft; and means for rocking the arms to cause the shaft to traverse the slots, whereby the shaft may swing gradually from substantially the plane of the discharge opening to the axis of the container as unloading progresses and the flails may be simultaneously gradually extended.

2. The combination of claim 1 in which the means for selectively clutching or releasing the shaft and the sleeve comprises selectively interlocking key and slot means on the shaft and sleeve, and means for producing relative endwise movement between parts of said key and slot means.

3. The combination of claim 2 in which the sleeve has an annular end wall provided with a radial slot, and a key is mounted for endwise movement on the shaft and has an integral lug that is selectively engageable in or disengageable from said slot upon endwise movement of the key.

4. The combination of claim 3 which includes radially extending means on the key outside one of the arms, a lever pivoted on said one of the arms, shoulder means on said lever loosely engaging said radially extending means to move the key endwise, spring means normally urging the lever to a position in which the key lug is engaged with the slotted wall of the sleeve, and means operatively connected to the lever and controllable from a tractor for moving said lever to disengage said lug from said slotted wall.

5. A material spreader adapted to be drawn behind a tractor comprising, in combination: a wheeled material container having two generally circular end walls and an arcuate side wall the longitudinal margins of which define the sides of a material discharge opening that occupies an upper quadrant between horizontal and vertical planes through the axes of the end walls, said end walls being provided with aligned arcuate slots which extend from said axes substantially to the longitudinal median line of the discharge opening; a pair of arms pivotally mounted outside the two end walls on the center of curvature of said slots; an unloader shaft in the container with its ends extending through said arcuate slots, said shaft being journaled in said arms; a plurality of flexible flails spaced along the shaft, said flails being adapted to be wrapped around the shaft and to unwind therefrom by centrifugal force when the shaft is rotated; a sleeve rotatably mounted on the shaft, said sleeve having holes through which the flails extend and the flails winding on the shaft inside the sleeve; clutch means for selectively clutching the sleeve to the shaft for rotation therewith or releasing the sleeve for rotation about the shaft; means controllable from a tractor for operating the clutch means; means for driving said shaft from a tractor power take-off; and means controllable from a tractor for rocking the arms to cause the shaft to traverse the slots, whereby the shaft may swing gradually from substantially the plane of the discharge opening to the axis of the container as unloading progresses and the flails may be simultaneously gradually extended.

6. The combination of claim 5 in which the means for rocking the arms comprises an extensible hydraulic cylinder and piston unit one end of which is pivotally mounted on an end wall of the container and the other end of which is pivoted adjacent an end of one of the arms.

7. The combination of claim 5 in which the means for driving the unloader shaft comprises an input shaft supported on a container end wall and adapted to be driven by a tractor power take-off, an input sprocket keyed on said input shaft, an idler sprocket rotatably mounted on the pivot axis of the arms, a drive sprocket on the unloader shaft, and drive chain means for conveying power from said input sprocket through said idler sprocket to said drive sprocket.

8. A material spreader comprising, in combination: a wheeled material container having two end walls and an arcuate wall secured to said end walls to provide the bottom and sides of the container; a rotatable unloader shaft extending longitudinally of the container; sleeve means including a plurality of annular bearing walls rotatably supported on the shaft and a cylindrical wall secured to said bearing walls in spaced relationship to the shaft, there being a plurality of longitudinally spaced flail openings in said cylindrical wall; a plurality of flexible flail members secured to the shaft and extending outwardly through said openings, there being one flail member associated with each opening, each flail member having a portion adapted to wind around the shaft and a flail member outside the sleeve; means for driving the shaft from a tractor power take-off; and means for selectively clutching the sleeve means to the shaft for rotation therewith or releasing the sleeve means for rotation about the shaft, whereby the unwinding of the flails from around the shaft may be controlled during rotation of the shaft.

9. The combination of claim 8 in which the means for selectively clutching or releasing the shaft and the sleeve comprises selectively interlocking key and slot means on the shaft and sleeve, and means for producing relative endwise movement between parts of said key and slot means.

10. The combination of claim 9 in which one of the bearing walls is provided with a radial slot, and a key is mounted for endwise movement on the shaft and has an integral lug that is selectively engageable in or disengageable from said slot upon endwise movement of the key.

11. The combination of claim 10 in which the key has a portion extending outwardly of an end wall of the container and has radially extending means on said portion, a lever is pivotally mounted outside said end wall and has shoulder means loosely engaging the radially extending means to move the key endwise, spring means normally urges the lever to a position in which the key lug is engaged with the slotted bearing wall, and means are operatively connected to the lever and controllable from a tractor for moving said lever to disengage said lug from the slotted bearing wall.

12. A material spreader comprising, in combination: a wheeled material container having two end walls and an arcuate wall secured to said end walls to provide the bottom and sides of the container; rotatable unloader shaft means extending longitudinally of the container; drive means for rotating said shaft means; sleeve means mounted for rotation on said shaft means; a plurality of flexible flail members secured to one of said means and adapted to wind around said one of said means, said flail members having flail plates which may abut the sleeve means when said members are so wound; and means for selectively clutching the sleeve means to the shaft means for rotation therewith or releasing said sleeve means for rotation about the shaft, whereby said flail members may unwind from said one of said means in response to operation of said clutch means during rotation of the unloader assembly by said drive means.

13. The combination of claim 12 in which the clutch means includes radially extending clutch dog means supported by the shaft means and longitudinally movable with respect to the sleeve means, and the sleeve means has a notch with which the clutch dog means is engageable when the latter is moved longitudinally.

14. The combination of claim 13 which includes a spring operatively connected to the clutch dog means to normally retain the latter in a predetermined position with respect to the sleeve means, and means for moving said dog means against the bias of said spring.

15. The combination of claim 12 in which means are provided for bodily shifting said unloader shaft means toward and away from said container.

16. The combination of claim 15 in which said end walls are provided with aligned arcuate slots with the ends of said unloader shaft means extending therethrough; and wherein said means for bodily shifting said unloader shaft means includes, an arm pivotally mounted outside each end wall, said shaft means being journaled in said arms, and means for rocking the arms to cause said shaft means to traverse said slots and move toward and away from said container.

References Cited in the file of this patent

UNITED STATES PATENTS

| | | |
|---|---|---|
| 2,701,940 | Carr | Feb. 15, 1955 |
| 3,004,765 | Wilkes | Oct. 17, 1961 |
| 3,011,793 | McElhinney et al. | Dec. 5, 1961 |

FOREIGN PATENTS

| | | |
|---|---|---|
| 142,675 | Germany | Aug. 1, 1903 |
| 1,125,702 | Germany | Mar. 15, 1962 |